United States Patent Office 2,782,162
Patented Feb. 19, 1957

2,782,162
METHOD OF TREATING SEA WATER

Robert W. Liddell, Jr., Bethel Township, Allegheny County, Pa., assignor to Hagan Corporation, Pittsburgh, Pa., a corporation of Pennsylvania No Drawing. Application July 7, 1952,
Serial No. 297,565

12 Claims. (Cl. 210—23)

This invention relates to the evaporation of sea water and materials useful therein and is a continuation-in-part of my copending application Serial No. 85,268, filed April 2, 1949 now abandoned. The evaporation of sea water in order to produce fresh water has been practiced for many years, particularly on ocean-going vessels. The sea water is pumped through an evaporating vessel, or a series of such vessels, having a heating coil or coils therein. The requisite heat is supplied by passing steam through the coils.

Sea water contains a very high concentration of calcium and magnesium salts, which are scale-forming. In some oceans silicon compounds which tend to form silicate scales are also encountered. Upon evaporation of the sea water these salts are, of course, left behind with the result that the concentration of solids within the evaporator increases and a large amount of scale is built up on the surface of the steam coil. This reduces the efficiency of the apparatus and requires periodic shut-downs for cleaning.

Various mechanical means for removing the scale have been proposed. Means have been provided for flexing the coil so as to break off the scale and to this end bimetallic structures have been devised, the differential expansion of the two metals being relied upon to flex the coil. So-called "shock" removal, by cutting off the steam supply and pumping cold water into the evaporator shell so as to chill it, has also been practiced. These methods have had only a limited measure of success. Moreover, they present a problem of sludge removal which is particularly troublesome in double or triple-effect evaporators where the sea water is passed successively through different chambers.

Chemical methods of scale prevention, while well-known in the treatment of fresh water, have not been successful in sea water evaporators. The treatments employed for fresh water have such low efficacy when applied to sea water evaporators that they may be characterized as useless for practical purposes. A little greater suppression of scale-forming may be achieved by increasing the dosage, but even so, the results are still unsatisfactory and the increased cost is alone sufficient to make such treatments prohibitive. What is desired is a chemical treatment which will inhibit scale formation and will be sufficiently low in cost to make it commercially feasible.

I have found that sea water may be evaporated and the steam coils kept virtually free from scale by the chemical treatment hereinafter described, at a very low cost.

I employ in my process a water-soluble alkali metal or ammonium molecularly dehydrated phosphate having a ratio of alkali-metal oxide or ammonium oxide to phosphorus pentoxide of from about 0.4:1 to about 2.0:1. This class of materials has been found highly effective for scale prevention in the treatment of fresh water. As above indicated, however, its use in corresponding amounts with sea water is of no substantial value, and no improvement commensurate with the increased cost is obtainable by increasing the amount of phosphate used.

I have discovered, however, that the concomitant use, in proper ratio, of the phosphate and certain lignin compounds is highly effective and results in what is apparently a synergistic effect since the effect of the combination is greater than would be expected from the knowledge of the results derived from adding the two materials separately.

I preferably employ still a third constituent, namely a water-soluble derivative of a polyalkylene glycol, in which the polyalkylene glycol molecule contains preferably from 1 to 20 alkylene oxide groups. The polyalkylene glycol derivative may be one of the group consisting of the esters, the ethers, the amines or the amides. Polyethylene glycol mono-oleate has been found to be particularly satisfactory. While the presence of this third constituent is not essential to successful results, its presence is advantageous in two respects: (a) tests indicate that the scale-suppressing or inhibiting power of the phosphate-lignin combination is enhanced and (b) foaming is materially reduced, thereby making it possible to operate at a consistently high water level in the evaporator with corresponding operating advantages yet without any objectionable carry-over of salinity into the distillate.

Strangely enough my process and composition offer no observable advantage in the prevention of scale deposition from scale-forming fresh waters.

The conditions of use are important. I have found that the temperature of the steam in the coils should not exceed about 250° F. I have also found that the pressure in the vapor space above the sea water in the evaporator should not exceed five pounds per square inch gage and is preferably atmospheric or sub-atmospheric. The treating materials should be introduced at such a point and in such a way as to insure uniform dissemination through the sea water under treatment.

The phosphates

I may employ in my compositions any water-soluble alkali metal or ammonium molecularly dehydrated phosphate having a ratio of alkali-metal oxide or ammonium oxide to phosphorus pentoxide of from about 0.4:1 to about 2.0:1. In view of the commercial availability of the sodium phosphates, I prefer to use them rather than the corresponding potassium, ammonium or lithium salts although these other salts may be employed.

Preferred phosphates are those within the $M_2O:P_2O_5$ range of about 0.9:1 to the tripolyphosphate composition having a ratio of 1.7:1, where M is an alkali metal or the ammonium radical. Those having a ratio from 0.4:1 to 0.9:1 are usually available as glasses which are acid-reacting in aqueous solution and are decreasingly soluble with the decrease in the amount of alkali metal in the glass and although effective for my purpose, the preparation of a treating solution is rendered somewhat difficult. Although the pyrophosphates, which are crystalline materials having a ratio of alkali metal to $P_2O_5$ of 2:1 are slightly effective in combination with the preferred lignin sulfonic acid derivatives the results do not begin to approach those obtained when the crystalline tripolyphosphates, which have a ratio of 1.7 alkali metal or ammonium oxide to 1 phosphorus pentoxide are used. In my preferred composition I use crystalline sodium tripolyphosphate.

The lignin derivatives

The term "lignin sulfonic acid derivative" as used herein is intended to be inclusive of the various complexes prepared by the drying of paper mill waste sulfite liquor or by treating such liquor so as to form purer lignin compounds as hereinafter more fully described.

The actual structure of lignin and of the lignin sulfonic acid derivatives is not known. It is known that certain materials are derived as a by-product of the sulfite process for the manufacture of paper, apparently from the reaction of the sulfite liquor on the cementing materials between the wood fibres. These materials have been called lignins.

The simple drying of waste sulfite liquor therefore produces a material containing lignin sulfonic acids and salts thereof, together with such materials as wood sugars, organic acids and calcium sulfite. I have found that this material is effective in my process but it may be desirable to use a purer material. It is known to mix the waste sulfite liquor with lime and then treat it again with lime to precipitate the lignin substances as basic calcium lignin sulfonate compounds. It is also known to treat calcium lignin sulfonates with soda ash so as to form the sodium salts; Howard patents Re. 18,268, 1,848,292 and 1,856,558. These latter compounds may be briefly styled as "Howard type materials."

It will be understood that limitations of overall costs may make it desirable to use different lignin sulfonic acid derivatives at different times or in different circumstances. I have successfully employed materials designated by their manufacturer, Marathon Corporation, as "No. 1523" and "No. 1310 S L," the former being somewhat more effective. These materials are both of the Howard type. I have also used products manufactured by International Paper Company, designated by it as "Standard Bindarene Flour" and "Bindarene Flour." These are not quite as effective quantatively as the two materials mentioned.

The ratio of components

Although the two constituents, phosphate and lignin, defined above may be employed in a weight ratio of phosphate compound to lignin compound ranging from about 0.5:1 to about 4:1 I prefer to use about 1.5 parts by weight of sodium tripolyphosphate and about 1.0 part by weight of lignin sulfonate compound. It is, of course, obvious that the weight ratio of phosphate compound to lignin compound will vary even when the lignin comes from the same source since the lignin compounds are derived from natural sources and the purity and composition may vary from time to time.

In my preferred composition, in which I incorporate a water-soluble polyalkylene glycol derivative of the group consisting of esters, ethers, amides and amines, I use about 1.5 parts by weight of sodium tripolyphosphate, about 1.0 part by weight of lignin sulfonate compound, and about 0.02–0.1 part by weight of a polyethylene glycol mono-oleate. The oleate is derived from a polyethylene glycol having a molecular weight of about 200 to about 400. I may vary the amount of phosphate from about 1 to 2 parts by weight and the polyethylene glycol mono-oleate from about 0.01 to 0.20 parts by weight, the amount of both these constituents calculated on the basis of 1 part lignin sulfonate.

The polyalkylene glycol derivatives

The previously-mentioned derivatives of the polyalkylene glycols seem to exert a synergistic effect on the other two components of the mixture. Whether they do this by producing a better wetting of the copper coils, by better dispersion of the lignin, or perhaps by still other mechanisms, I am unable to say, but results, not only as to rates of steaming but also as to uniformity of cleanness of test coils, have been improved by the presence of these polyalkylene glycol derivatives.

I have found that the high salt concentrations of sea water limits the polyalkylene glycol derivatives which can be used and that the polyethylene glycols which are usable as antifoams in fresh water are not necessarily effective as antifoams in sea water and vice versa. For example, "Triton X–100," which consists of octyl phenol with a polyethylene glycol chain will act as an antifoam at 0.2 to 0.5 p. p. m. in my process but will cause boiler water at 2500 p. p. m. to go over the top of the test column when as little as 0.5 p. p. m. are added. In general, I have found that for salt water evaporators, the longer the hydrocarbon chain (in its class) the more effective is the polyalkylene derivative. Thus octadecyl alcohol is more effective than a commercial solution of hexadecyl and dodecyl alcohols, while this in turn is much more effective than pure dodecyl alcohol alone. I have also found in general that the shorter the alkylene oxide chain, the more effective the material appears to be. For example, octadecyl alcohol with 10 moles of ethylene oxide is an excellent antifoam at 0.1 p. p. m. while with 20 moles of ethylene oxide 0.2 p. p. m. is required and with 40 moles of ethylene oxide 2 p. p. m. is necessary.

I have found that the polyethylene glycol mono-oleates, particularly those in which the molecular weight of the polyethylene glycol is about 200 to about 400, are very effective in repressing the foaming of boiling sea water or of 3% sodium chloride solutions when preent in concentrations of as little as 0.04 part per million. Polyethylene glycol mono-oleates in which the molecular weight of the polyethylene glycol is as great as 600 have been used but are less effective under certain conditions, particularly under high vacuum. Other similar and readily dispersible water-soluble higher esters in which the molecular weight of the polyalkylene glycol portion varies from about 200 to 600 such as the mono-lauryl ester and the mono-ricinoleic ester are also good antifoam agents.

I have also found that the soluble higher ethers of the polyalkylene glycols such as lauryl and oleyl ethers of the polyalkylene glycols in which the polyalkylene glycol portion of the molecule has a molecular weight from about 200 to 600 are good antifoams and are less likely to decompose than the esters. However, they are required in somewhat higher concentrations than the esters. Under some conditions, such as the presence of organic dispersives, they seem to lose their effectiveness, hence under such circumstances from 3 to 10 times as much of them are required as of the esters. I have discovered that the higher esters and ethers of other polyalkylene glycols such as the polypropylene glycols as well as the mixed polyethylene-polypropylene glycols are roughly equivalent to their respective polyethylene glycol derivatives.

The amines and the amides of the polyalkylene glycols such as octadecyl amine with 5 to 10 moles of ethylene oxide and the oxtadecyl amide with 5 to 10 moles of ethylene oxide are likewise suitable polyalkylene glycol derivatives for use in my invention.

I have found, in general, that the preferred materials for use in the composition of my invention fall within the following groups:

The esters $C_{12}$ to $C_{20}$ acid with from 1 to 14 ethylene oxide groups
$C_{12}$ to $C_{18}$ acid with from 5 to 15 propylene oxide groups

The ethers $C_{16}$ to $C_{18}$ alcohol with from 2 to 20 ethylene oxide groups
$C_{12}$ to $C_{18}$ alcohol with from 5 to 20 propylene oxide groups Monobutyl ethers of mixed propylene and ethylene oxides with molecular weights between 600 and 5000 are satisfactory in evaporators operating at pressures approaching atmospheric.

The amines $C_{16}$ to $C_{18}$ amines with from 5 to 10 ethylene oxide groups

The amides

C₁₆ to C₁₈ amides with from 5 to 10 ethylene oxide groups

Polyalkylene glycols as antifoaming agents are the subject of a separate patent application by the same inventor, bearing Serial No. 85,267, filed April 2, 1949 now abandoned.

The weight of the antifoam may be from about 1% to about 20% of the total compound. A very satisfactory composition for the compound is about 3% polyethylene glycol, 200 mono-oleate, 58% tripolyphosphate, and 39% of purified and dried sulfite waste liquor.

Conditions of blowdown

In shipboard use a sea water evaporator will ordinarily be operated at about 67% "blowdown"; i. e., of every three tons of sea water passed through the evaporator, one ton will be evaporated and two tons will be discharged as waste. Under these conditions the addition of my treating composition in amounts as low as five parts per million has a marked effect and the use of ten parts per million keeps the coils substantially free from adherent scale.

In some cases it may be deemed desirable to operate with a lesser blowdown, in which case the concentrations should be increased. For a 50% blowdown a concentration of say 15 parts per million will be found desirable and for a 25% blowdown it may be as high as 30 parts per million. It will be understood, however, that the economic margin is very small and that the total cost of the compound employed will be a material factor in determining the operating conditions.

While I have described a present preferred application of my invention, it may be otherwise embodied within the scope of the following claims.

I claim:

1. A method of treating sea water whereby it is rendered less scale-forming when heated which comprises adding thereto an effective amount up to 50 parts per million of a water-soluble molecularly dehydrated phosphate of the group consisting of the alkali metals and ammonium having a molar ratio of group member oxide to phosphorus pentoxide from about 0.4:1 to about 2.0:1, and a water soluble salt of lignin sulfonic acid.

2. A method of treating sea water whereby it is rendered less scale-forming when heated which comprises adding thereto an effective amount up to 50 parts per million of a water-soluble molecularly dehydrated phosphate of the group consisting of the alkali metals and ammonium having a ratio of group member oxide to phosphorus pentoxide of about 0.4:1 to about 2.0:1 and a water soluble salt of lignin sulfonic acid, the ratio of phosphate to lignin sulfonic acid salt being about 1:1 to about 2:1.

3. A method of treating sea water whereby it is rendered less scale-forming when heated which comprises maintaining therein a concentration of about 5 parts per million to about 50 parts per million of a composition comprising a water-soluble molecularly dehydrated phosphate of the group consisting of alkali metals and ammonium having a molar ratio of group member oxide to phosphorus pentoxide of about 0.4:1 to about 2.0:1 and a water soluble salt of lignin sulfonic acid, the ratio of phosphate to lignin sulfonic acid salt being between about 1:1 and about 2:1.

4. A method of treating sea water whereby it is rendered less scale-forming when heated which comprises adding thereto an effective amount up to about 50 parts per million of a mixture consisting of a water-soluble crystalline sodium tripolyphosphate and a water-soluble salt of lignin sulfonic acid, the ratio of phosphate to lignin sulfonic acid salt being about 1:1 to about 2:1.

5. A method of treating sea water whereby it is rendered less scale-forming when heated which comprises maintaining therein a concentration of from about 5 parts per million to about 50 parts per million of a mixture comprising a water-soluble crystalline sodium tripolyphosphate and a water soluble salt of lignin sulfonic acid, the ratio of phosphate to lignin sulfonic acid salt being about 0.5:1 to about 2:1.

6. A method of treating sea water whereby to minimize the scale-forming and foaming characteristics thereof when heated which comprises adding thereto an effective amount up to about 50 parts per million of a water-soluble molecularly dehydrated phosphate of the group consisting of alkali metals and ammonium, a water soluble salt of lignin sulfonic acid, and a polyalkylene glycol derivative selected from the group consisting of the ethers, the esters, the amines and the amides.

7. A method of treating sea water whereby to minimize the scale-forming and foaming characteristics thereof when heated which comprises adding thereto an effective amount up to about 50 parts per million of a water-soluble molecularly dehydrated phosphate of the group consisting of alkali metals and ammonium, having a ratio of group member oxide to phosphorus pentoxide of about 0.4:1 to about 2.0:1, a water soluble salt of lignin sulfonic acid and a polyalkylene glycol derivative in which the polyalkylene glycol molecule has a molecular weight of about 200 to 5000 and selected from the group consisting of ethers, esters, amines and amides.

8. A method of treating sea water whereby to minimize the scale-forming and foaming characteristics thereof when heated which comprises adding thereto an effective amount up to about 50 parts per million of a mixture comprising by weight about 1 to 2 parts water-soluble molecularly dehydrated phosphate of the group consisting of alkali metal and ammonium and having a molar ratio of group member oxide to phosphorus pentoxide of about 0.4:1 to 2.0:1, 1 part water soluble lignin sulfonic acid salt and from 0.02–0.20 parts of a polyalkylene glycol derivative in which the polyalkylene glycol molecule contains from 1 to 20 alkylene oxide groups and selected from the group consisting of water-soluble ethers, esters, amines and amides.

9. A method of treating sea water whereby to minimize the scale-forming and foaming characteristics thereof when heated which comprises adding thereto an effective amount up to about 50 parts per million of a mixture comprising by weight about 1 to 2 parts water-soluble alkali-metal molecularly dehydrated phosphate having a molar ratio of alkali-metal oxide to phosphorus pentoxide of about 0.4:1 to 2.0:1, 1 part water soluble lignin sulfonic acid salt and from 0.02–0.20 parts of a polyalkylene glycol derivative in which the polyalkylene glycol molecule contains from 1 to 20 alkylene oxide groups and selected from the group consisting of water-soluble ethers, esters, amines and amides having from 12 to 20 carbon atoms in the ether, ester, amine and amide group.

10. A method of treating sea water to be used in evaporators to prevent the formation of scale and foaming which comprises adding to the sea water about 5 to 30 parts per million the basis of the feed water, a composition consisting of about one part of evaporated waste sulfite liquor, 1 to 2 parts of sodium tripolyphosphate and about 0.02:0.1 parts per million of polyethyylene glycol mono-oleate where the molecular weight of the polyethylene glycol molecule is about 200 to 400.

11. A method of treating sea water to be used in evaporators to prevent the formation of scale and foaming which comprises adding to the sea water about 5 to 30 parts per million on the basis of the feed water, a composition consisting of about 1 part of evaporated waste sufite liquor, 1 to 2 parts of sodium tripolyphosphate and about 0.02:0.1 parts per million of polyethylene glycol mono-oleate.

12. A method of treating sea water for use in evaporators which comprises adding to the sea water about 5 to 30 parts per million on the basis of the feed water of a composition consisting of one part of evaporated waste sulfite liquor, 1 to 2 parts of sodium tripolyphosphate and about 0.02:0.1 parts per million of a polyethylene glycol mono-ester where the fatty acid chain contains about 12 to 18 carbon atoms.

References Cited in the file of this patent

UNITED STATES PATENTS

| | | |
|---|---|---|
| 2,248,656 | Bird | July 8, 1941 |
| 2,318,663 | Bird | May 11, 1943 |
| 2,358,222 | Fink et al. | Sept. 12, 1944 |
| 2,374,100 | Jackson | Apr. 17, 1945 |
| 2,391,895 | Gunderson | Jan. 1, 1946 |
| 2,453,352 | Tremain et al. | Nov. 9, 1948 |
| 2,505,457 | Bird | Apr. 25, 1950 |
| 2,575,298 | Ryznar | Nov. 13, 1951 |
| 2,576,386 | Bird | Nov. 27, 1951 |

FOREIGN PATENTS

| | | |
|---|---|---|
| 619,040 | France | Mar. 25, 1927 |
| 717,078 | Germany | Feb. 5, 1942 |

OTHER REFERENCES

Chemicals by Glyco, Pub. of Glyco Pdts. Co., N. Y., 1944, p. 24.

Polyethylene Glycol Esters, Pub. of Kessler Chem. Co., Phila., 1948, pp. 8–9.